United States Patent [19]
Ubukata et al.

[11] Patent Number: 5,656,340
[45] Date of Patent: Aug. 12, 1997

[54] LIQUID CRYSTAL DISPLAY DEVICE

[75] Inventors: Masami Ubukata; Haruhiko Itoh, both of Tokorozawa; Fumie Nozawa, Asaka; Kazuya Nagao, Kawagoe; Takamasa Harada, Inzai-machi, all of Japan

[73] Assignee: Hoechst Aktiengesellschaft, Frankfurt, Germany

[21] Appl. No.: 477,996

[22] Filed: Jun. 7, 1995

[30] Foreign Application Priority Data

Jun. 28, 1994 [JP] Japan .................. 6-146575

[51] Int. Cl.$^6$ .................................. G02F 1/1337
[52] U.S. Cl. .................................. 428/1; 349/123
[58] Field of Search .................. 428/1; 359/75

[56] References Cited

U.S. PATENT DOCUMENTS 5,437,813  8/1995  Akashi et al. .................. 359/75

OTHER PUBLICATIONS

Scheffer, T.J., et al., "A new, highly multiplexable liquid crystal display" Appl. Phys. Lett. 45 (10), 15 Nov. 1984, pp. 1021–1023.

Toko, Yasuo, et al., "Amorphous twisted nematic–liquid crystal displays fabricated by nonrubbing showing wide and uniform viewing–angle characteristics accompanying excellent voltage holding ratios" J. Appl. Phys. 74 (3), Aug. 1, 1993, pp. 2071–2075.

Toko, Yasuo, et al., "P-49: TN–LCDs fabricated by non–rubbing showing wide and homogeneous viewing angular characteristics and excellent voltage holding ratio" SID 93 Digest, pp. 622–625; Dec. 1993.

*Primary Examiner*—Alexander Thomas
*Attorney, Agent, or Firm*—Curtis, Morris & Safford, P.C.

[57] ABSTRACT

To provide a liquid crystal display device provided with a liquid crystal alignment layer which is excellent in adhesion to a glass substrate and which has less dependency of display characteristics upon a viewing angle.

A liquid crystal display device having a liquid crystal layer between a pair of substrates each comprising a transparent electrode having provided thereon an alignment layer wherein the alignment layers are arranged inside so as to face each other, characterized in that a mixture of a polyamide (A) containing siloxane component as a constituting unit and a polymer (B) having a property of aligning the liquid crystal in such a manner that the direction of a long axis of the liquid crystal molecule projected on the surface of the substrate is different from a rubbing direction is used as an alignment layer material of at least one of the facing surfaces on the pair of substrates.

19 Claims, No Drawings

LIQUID CRYSTAL DISPLAY DEVICE

This invention relates to a liquid crystal display device. More specifically, this invention relates to a liquid crystal display device having a wide viewing angle using a mixture of specific polymer compounds as an alignment layer material.

A liquid crystal display device is an electrooptical device comprising a liquid crystal whose optical characteristics vary according to an external electrical field. For example, in a TN (twisted nematic) type liquid crystal display device, a liquid crystal alignment layer is provided on the surface of a solid substrate so that the liquid crystal molecules on the surface of the substrate are in a uniform alignment state to the surface, and the surface is subjected to a rubbing treatment. That is, a liquid crystal alignment layer obtained by preparing a thin film of a heat-resistant polymer such as a polyimide and a polyamide on a solid substrate such as a glass plate by means of a spin-coating, printing or dipping method or the like, drying or curing the thin film thus prepared, and then rubbing the thin film in one direction by means of a cloth or the like. Thus, the liquid crystal is aligned in one direction by the resulting liquid crystal alignment layer and, at the same time, a liquid crystal alignment tilt angle (a pretilt angle) which is generally about 2 to 4 degree to the surface of the substrate is obtained. However, since the above-described film of polyimide, polyamide, etc. has a poor adhesion to the glass substrate, it has a defect in that the coated film is partially peeled off during the rubbing treatment, thereby causing defects of alignment.

Further, a display device with super twisted birefringence effects (STN) which is excellent in display contents has been developed for a large-sized display (T. J. Scheffer and J. Nehring, Appl. Phys. Lett. 45 (10), 1021 (1984)). For obtaining the super twisted birefringence effects, a nematic liquid crystal blended with a chiral agent is used. The twist angle of the liquid crystal molecule in the liquid crystal display device is from 180 to 270 degree in the case of the STN type as compared with that of at about 90 degree in the case of the TN type. The larger the twist angle, the better the dependence upon viewing angles. However, even when either of the above-described alignment layers is used, there is a problem that the display contrast depends on the viewing angle and gray-scale reversal occures when the viewing angle is shifted to several ten degrees from the front surface.

To improve the viewing characteristics, the method of divisional system (Y. Toko, Y. Iimura et al., SID 93 Digest 622) and the method of random domain (Y. Toko, T, Sugiyama et al., J.A.P. 74, 2071 (1993)) have been proposed, but the divisional system has a problem in that an additional process is required for the usual process, and the method in which the random domain is formed has a problem in that the contrast is greatly reduced.

Accordingly, the object of the present invention is to solve the above-described problems and to provide a liquid crystal display device having a liquid crystal alignment layer which is excellent in adhesion to the glass substrate and having less dependency of display characteristics upon the viewing angle.

The present invention provides a liquid crystal display device having a liquid crystal layer between a pair of substrates each comprising a transparent electrode having provided thereon an alignment layer, wherein the alignment layers are arranged so as to face each other, characterized in that a mixture of a polyamide (A), containing a siloxane component, and a polymer (B), having the property of aligning the liquid crystal in such a manner that the direction of the long axis of the liquid crystal molecules projected on the surface of the substrate is different from the rubbing direction, is used as an alignment layer material of at least one of the facing surfaces on the pair of substrates. As the siloxane component which is a constituting unit of the polyamide (A), a modified siloxane compound having a reactive group at the terminal thereof represented by the following general formula (I) can be used.

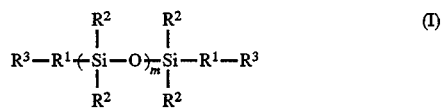

wherein m is an integer of 1 or more, $R^1$ is a divalent hydrocarbon group, $R^2$ is a monovalent straight chain or branched chain aliphatic hydrocarbon group having from 1 to 5 carbon atoms, an alicyclic hydrocarbon group or an aromatic hydrocarbon group, and $R^3$ is —$NH_2$, —OH, —COOH or —$NHSi(CH_3)_3$.

The hydrocarbon group used for $R^1$ includes, for example, straight chain alkylene groups such as —$CH_2$—, —$(CH_2)_2$— and —$(CH_2)_3$— and branched chain alkylene groups, either having preferably from 1 to 8 carbon atoms.

The aliphatic hydrocarbon group used for $R^2$ includes, for example, methyl, ethyl, propyl, isopropyl, n-butyl, isobutyl, t-butyl, pentyl and the like. The alicyclic hydrocarbon group includes, for example, cyclopropyl, cyclobutyl, cyclopentyl, cyclohexyl and the like. The aromatic hydrocarbon group includes, for example, phenyl, tolyl, xylyl, biphenyl, naphthyl, anthryl, phenanthryl and the like, and further include aromatic/hydrocarbons being substituted with halogen one or more, nitro groups, one or more alkyl groups, etc. on the aromatic ring thereof. Each $R^2$ may be the same or different, and preferably $R^2$ is methyl.

m is an integer of 1 or more and preferably 5 or more. When the degree of polymerization of the polysiloxane is too high, the strength of the alignment layer material decreases and therefore m is preferably 100 or less.

In the alignment layer material of the present invention, the siloxane content in the composition of polyamide (A), containing a siloxane compound, may be varied by changing the amount of the siloxane compound in the synthesis thereof. Further, the pretilt angle can be altered by changing the siloxane content in the composition. The siloxane content in the composition is from 0.1% to 80%, preferably from 1% to 50% by weight.

The polyamide compound as an amide component which is a constituting unit of the polyamide (A) of the present invention may be formed from a diamine ($H_2N$—B—$NH_2$) and a dichloride of a dicarboxylic acid (HOOC—A—COOH).

Examples of the diamine include aliphatic or alicyclic diamines such as 1,1-metaxylenediamine, 1,3-propanediamine, tetramethylenediamine, pentamethylenediamine, hexamethylenediamine, octamethylenediamine, nonamethylenediamine, 4,4-diaminoheptamethylenediamine, 1,4-diaminocyclohexene, isophoronediamine, tetrahydrodicyclopentadienylenediamine, hexahydro-4,7-methanoindanylenedimethylenedimaine, and tricyclo [6.2.1.0$^{2,7}$]-undecylenedimethyldiamine. Examples of the aromatic diamine include m-phenylenediamine, p-phenylenediamine, 4,4'-diaminodiphenylmethane, 4,4'-diaminodiphenyl-ether, 4,4'-diaminophenylsulfone, 2,2-(4,4'-diaminodiphenyl)propane, 4,4'-diaminodiphenyl sulfide, 1,5-diaminonaphthalene, 4,4'-diaminodiphenylethane, m-toluenediamine, p-toluenediamine, 3,4'-diaminobenzanilide, 1,4-diaminonaphthalene, 3,3'-dichloro-4,4'-diaminodiphenyl, benzidine, 4,4'-diaminodiphenylamine, 4,4'-diaminodiphenyl-N-methylamine, 4,4'-diaminodiphenyl-N-phenylamine, 3,3'-diaminodiphenylsulfone, 4,4'-diaminodiphenyldiethylsilane, 4,4'-diaminodiphenylsilane, 3,4'-diaminodiphenylmethane, 1,1-diaminodiphenylethane, 3,4'-diaminodiphenylether, 3,4'-diaminodiphenylsulfone, 2,2-(3,4'-diaminodiphenyl)propane, 3,4'-diaminodiphenyl sulfide, 3,4'-diaminobenzanilide, 3,4'-diaminobenzophenone, 1,1-(3,4'-diaminodiphenyl)cyclohexane, 1,1-(3,4'-diaminodiphenyl)cyclopentane, 3,4'-diaminodiphenyldifluoromethane, 2,2-(3,4'-diaminodiphenyl)hexafluoropropane, 2,5,2',5'-tetramethyl-3,4'-diaminodiphenylmethane, 2,5,2',5'-tetramethyl-3,4'-dimainodiphenylether, 2,5,2',5'-tetramethyl-3,4'-diaminodiphenylsulfone, 2,5,2',5'-tetramethyl-3,4'-dimainodiphenyl sulfide, 2,5,2',5'-tetramethyl-3,4'-diaminobenzanilide, 2,5,2',5'-tetramethyl-3,4'-diaminobenzophenone, 2,2'-dichloro-3,4'-diaminodiphenylmethane, 2,2'-dichloro-3,4'-diaminodiphenyl ether, 2,2'-dibromo-3,4'-diaminodiphenylsulfone, 2,2'-difluoro-3,4'-diaminobenzophenone, 2,2'-bis[4-(4-aminophenoxy)phenyl]propane, 2,2-bis[3-methyl-4-(4-aminophenoxy)phenyl]propane, 2,2-bis[3-bromo-4-(4-aminophenoxy)phenyl]propane, 2,2-bis[3-ethyl-4-(4-aminophenoxy)phenyl]propane, 2,2-bis[3-propyl-4-(4-aminophenoxy)phenyl]propane, 2,2-bis[3-isopropyl-4-(4-aminophenoxy)phenyl]propane, 2,2-bis[3-butyl-4-(4-aminophenoxy)phenyl]propane, 2,2-bis[3-sec-butyl-4-(4-aminophenoxy)phenyl]propane, 2,2-bis[3-methoxy-4-(4-aminophenoxy)phenyl]propane, 2,2-bis[3-ethoxy-4-(4-aminophenoxy)phenyl]propane, 2,2-bis[3,5-dimethyl-4-(4-aminophenoxy)phenyl]propane, 2,2-bis[3,5-dichloro-4-(4-aminophenoxy)phenyl]propane, 2,2-bis[3,5-dibromo-4-(4-aminophenoxy)phenyl]propane, 2,2-bis[3,5-dimethoxy-4-(4-aminophenoxy)phenyl]propane, 2,2-bis[3-chloro-4-(4-aminophenoxy)-5-methylphenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]-ethane, 1,1'-bis[3-bromo-4-(4-aminophenoxy)phenyl]ethane, 1,1-bis[3-ethyl-4-(4-aminophenoxy)phenyl]ethane, 1,1-bis[3-propyl-4-(4-aminophenoxy)phenyl]ethane, 1,1-bis[3-isopropyl-4-(4-aminophenoxy)phenyl]ethane, 1,1-bis[3-butyl-4-(4-aminophenoxy)phenyl]ethane, 1,1-bis[3-sec-butyl-4-(4-aminophenoxy)phenyl]ethane, 1,1-bis[3-methoxy-4-(4-aminophenoxy)phenyl]ethane, 1,1-bis[3-ethoxy-4-(4-aminophenoxy)phenyl]ethane, 1,1-bis[3,5-dimethyl-4-(4-aminophenoxy)phenyl]ethane, 1,1-bis[3,5-dichloro-4-(4-aminophenoxy)phenyl]ethane, 1,1-bis[3,5-dibromo-4-(4-aminophenoxy)phenyl]ethane, 1,1-bis[3,5-dimethoxy-4-(4-aminophenoxy)phenyl]ethane, 1,1-bis[3-chloro-4-(4-aminophenoxy)-5-methylphenyl]ethane, bis[4-(4-aminophenoxy)phenyl]methane, bis[3-methyl-4-(4-aminophenoxy)phenyl]methane, bis[3-chloro-4-(4-aminophenoxy)phenyl]methane, bis[3-bromo-4-(4-aminophenoxy)phenyl]methane, bis[3-ethyl-4-(4-aminophenoxy)phenyl]methane, bis[3-propyl-4-(4-aminophenoxy) phenyl]methane, bis[3-isopropyl-4-(4-aminophenoxy)phenyl]methane, bis[3-butyl-4-(4-aminophenoxy)phenyl]methane, bis[3-sec-butyl-4-(4-aminophenoxy)phenyl]methane, bis[3-methoxy-4-(4-aminophenoxy)phenyl]methane, bis[3-ethoxy-4-(4-aminophenoxy)phenyl]methane, bis[3,5-dimethyl-4-(4-aminophenoxy)phenyl]methane, bis[3,5-dichloro-4-(4-aminophenoxy)phenyl]methane, bis[3,5-dibromo-4-(4-aminophenoxy)phenyl]methane, bis[3,5-dimethoxy-4-(4-aminophenoxy)phenyl]methane, bis[3-chloromethoxy-4-(4-aminophenoxy)-5-methylphenyl]methane, 1,1,1,3,3,3-hexafluoro-2,2-bis[4-(4-aminophenoxy)phenyl]propane, 1,1,1,3,3,3-hexachloro-2,2-bis[4-(4-aminophenoxy)phenyl]propane, 3,3-bis[4-(4-aminophenoxy)phenyl]pentane, 1,1-bis[4-(4-aminophenoxy)phenyl]propane, 1,1,1,3,3,3-hexafluoro-2,2-bis[3,5-dimethyl-4-(4-aminophenoxy)phenyl]propane, 1,1,1,3,3,3-hexachloro-2,2-bis[3,5-dimethyl-4-(4-aminophenoxy)phenyl]-propane, 3,3-bis[3,5-dimethyl-4-(4-aminophenoxy) phenyl]pentane, 1,1-bis[3,5-dimethyl-4-(4-aminophenoxy)phenyl]propane, 1,1,1,3,3,3-hexafluoro-2,2-bis[3,5-dibromo-4-(4-aminophenoxy)phenyl]propane, 1,1,1,3,3,3-hexachloro-2,2-bis[3,5-dibromo-4-(4-aminophenoxy)phenyl]propane, hexafluoro-2,2-bis(4-carboxyphenyl)propane, hexafluoro-2,2-bis(3-amino-4,5-dimethylphenyl)propane, hexafluoro-2,2-bis(4-hydroxy-3-aminophenyl)-propane, 4,4'-bis[2-(4-aminophenoxyphenyl)hexafluoropropyldiphenyl ether], 3,3-bis[3,5-dibromo-4-(4-aminophenoxy)phenyl]pentane, 1,1-bis[3,5-dibromo-4-(4-aminophenoxy)phenyl]propane, 2,2-bis[4-(4-aminophenoxyphenyl]butane, 2,2-bis[3-methyl-4-(4-aminophenoxy)phenyl]butane, 2,2-bis[3,5-dimethyl-4-(4-aminophenoxy)phenyl]butane, 2,2-bis[3,5-dibromo-4-(4-aminophenoxy)phenyl]butane, 1,1,1,3,3,3-hexafluoro-2,2-bis[3-methyl-4-(4-aminophenoxy)phenyl]propane, 1,1-bis[4-(4-aminophenoxy)phenyl]cyclohexane, 1,1-bis[4-(4-aminophenoxy)phenyl]cyclopentane, bis[4-(4-aminophenoxy)phenyl]sulfone, bis[4-(4-aminophenoxy)phenyl]ether, bis[4-(3-aminophenoxy)phenyl]sulfone, 4,4-carbonylbis(p-phenyleneoxy)dianiline and 4,4'-bis(4-aminophenoxy)diphenyl. The silylated component of the diamines can be obtained by silylating the above-described diamines.

The dichlorides of carboxylic acids include dichlorides of terephthalic acid, isophthalic acid, phthalic acid, diphenyl ether dicarboxylic acid, diphenylsulfone dicarboxylic acid, diphenyldicarboxylic acid, and naphthalenedicarboxylic acid.

In the present invention, the polyamide (A) is preferably a block copolymer. In a block copolymer, repeating units are arranged regularly, and a substantially constant pretilt angle can be obtained irrespective of heating temperature and rubbing strength.

Particularly preferably, at least one aramide-silicon-multiblock copolymer having the following repeating unit is used as polyamide (A):

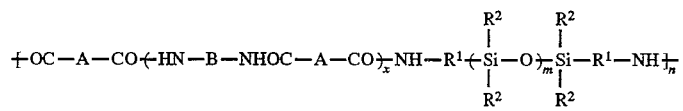

wherein m is an integer of from 1 to 100, n and x are integers of 1 or more, preferably 1 to 100, A is a para-phenylene group, a meta-phenylene group, a diphenylene group, a naphthylene group or

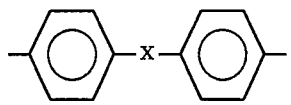

(wherein X represents —O—, —SO$_2$—, —CO—, —S—, —C(CH$_3$)$_2$—, —C(CF$_3$)$_2$—, —SO— or —CH$_2$—), B is a divalent hydrocarbon group, R$^1$ is a divalent hydrocarbon group having from 1 to 5 carbon atoms, R$^2$ is a monovalent straight chain or branched chain aliphatic hydrocarbon group having from 1 to 5 carbon atoms, an alicyclic hydrocarbon group or an aromatic hydrocarbon group, and the polysiloxane content is from 0.2% to 80%.

The type of Polymer (B) used in the present invention is not particularly limited as long as it has a property of aligning the liquid crystal in such a manner that the direction of the long axis of the liquid crystal molecule, when projected on the surface of the substrate, is different from the rubbing direction. The angle formed by the projected direction and the rubbing direction can be adjusted by selecting the type of the polymer used and conditions for rubbing. For example, the conditions are determined so that the angle can be within the range of 0.1° to 180°, 1° to 180°, 2° to 180°, 3° to 180°, 10° to 180°, 20° to 180°, 40° to 180° and 80° to 180°. Also, the projected direction may the direction in which the rubbing direction is rotated to right or left.

On the surface of the coated film of blended polymer (A) and polymer (B), it is supposed that the two polymers make a micro phase separation structure. In the micro-domains of polymer (B), the long axis of the liquid crystal molecules projected on the substrate was found to be rotated by several degrees with respect to the rubbing direction. In the micro-domains of polymer (A), the long axis of the liquid crystal molecules was found to correspond to the rubbing direction. As each micro-domain has a different direction, which causes the problems of low contrast and gray-scale reversal, the adverse effect is compensated, and viewing angle and contrast are improved.

In the present invention, use of a Polymer (B) having a helical structure is preferred. Examples of polymers having a helical structure include pyranoses such as octyl-α-D-glucopyranoside, phenyl-β-D-galactopyranoside and phenyl-β-glucopyranoside, α-D-galactose, phloridzin dihydrate, rutin trihydrate, poly-D-galacturonic acid, pectin, polypropylene glycol, polypropylene glycol triol, polypeptides such as polyglycine and polyglycylalanine, araminogalactane, galactoglucomannane, poly(γ-benzyl L-glutamate), xylan, xylanase and celluloses. The use of cellulose or a derivative thereof is particularly preferred.

Examples of cellulose and derivatives thereof used in the present invention include hydroxypropyl cellulose, cellulose, hydroxymethyl cellulose, cellulose acetate butylate, cellulose acetate phthalate, cellulose triacetate, methyl cellulose, cellulose acetate, cellulose hydroxypeptide, p-aminobenzyl cellulose, polyethyleneimine cellulose, triethylaminoethyl cellulose, ethyl cellulose, cyanoethylated cellulose, carboxymethylated cellulose, diethylaminohydroxypropylated cellulose, sulfohydroxypropylated cellulose, trimethylaminohydroxypropylated cellulose, cellulose acetate hydrogen phthalate, cellulose propionate, bromoacetyl cellulose, carboxymethyl cellulose hydrazide, cellulose ether, DEAE-cellulose, cellulose-PAB, cellulose-TEAE, cellulose ethyl hydroxyethyl ether, cellulose-2-hydroxypropylmethyl ether, phenoxyacetyl cellulose, and cellulose cyanoethylated.

In the present invention, use of a polystyrene or a derivative thereof as Polymer (B) is also preferred.

Examples of polystyrene and the derivatives thereof used in the present invention include polystyrene, sodium poly-4-styrenesulfonate, dicarboxy-terminated polystyrene, monocarboxy-terminated polystyrene, polystyrene divinylbenzene, polystyrene methyl methacrylate, 3-trifluoromethylstyrene and poly-4-methylstyrene.

In the present invention, it is believed that, by mixing the above-described polyamide (A) and polymer (B), a shift in the alignment direction by rubbing occurs in micro domains and, as a result, a shift in a twisting direction of the liquid crystal improves display characteristics of the domains having a poor viewing angle.

In the present invention, an intrinsic viscosity (η$_{lnh}$) of the alignment layer material is generally from 0.05 dl/g to 10 dl/g (below 30° C., as a 0.5 g/dl dimethylacetamide solution), preferably from 0.05 dl/g to 5 dl/g.

In the present invention, each of the polyamide (A) and the polymer (B) may be used in a single kind or in a combination of two or more kinds.

The mixing ratio of the alignment layer materials, polyamide (A) to polymer (B), according to the present invention is from 1:20 to 20:1, preferably from 1:10 to 5:1.

The liquid crystal display device using the liquid crystal alignment layer of the present invention can be prepared by, for example, the following method.

First, a transparent electroconductive layer in a pattern form is provided on a substrate, and a solution containing the liquid crystal alignment layer materials according to the present invention is coated on the side of the transparent electroconductive layer of the substrate by the roll-coater method, the spinner method, the printing method or the like, followed by heating generally at a temperature of from 80° to 350° C. to form a coated film. The film thickness of the coated film is generally from 5 nm to 1000 nm.

Organic solvents used for dissolving the polyamide (A) and the polymer (B) as the liquid crystal alignment materials of the present invention are not particularly limited as long as they are capable of dissolving the materials, and examples of solvents include nonprotonic polar solvents such as N-methyl-2-pyrrolidone, N,N-dimethylacetamide, N,N-dimethylformamide, dimethyl sulfoxide, γ-butyrolactone, tetramethylurea and hexamethylphosphortriamide, and phenol type solvents such as m-cresol, xylenol, phenol and halogenated phenols.

Further, other usual organic solvents may be mixed with the above solvent in such an amount that they do not precipitate the alignment layer materials. Examples of such organic solvents include alcohols, ketones, esters, ethers, halogenated hydrocarbons and hydrocarbons, for example, methyl alcohol, ethyl alcohol, isopropyl alcohol, cyclohexanol, ethylene glycol, propylene glycol, 1,4-butanediol, triethylene glycol, ethylene glycol monomethyl ether, acetone, methyl ethyl ketone, methyl isobutyl ketone, cyclohexanone, methyl acetate, ethyl acetate, butyl acetate, diethyl oxalate, diethyl malonate, diethyl ether, ethylene glycol methyl ether, ethylene glycol ethyl ether, ethylene glycol-n-propyl ether, ethylene glycol-i-propyl ether, ethylene glycol-n-butyl ether, ethylene glycol dimethyl ether, ethylene glycol ethyl ether acetate, diethylene glycol dimethyl ether, diethylene glycol monoethyl ether, dietylene glycol monomethyl ether, diethylene glycol diethyl ether, tetrahydrofuran, dichloromethane, 1,2-dichloroethane, 1,4-dichlorobutane, trichloroethane, chlorobenzene, o-dichlorobenzene, hexane, heptane, octane, benzene, toluene and xylene.

The coated film formed on the substrate is subjected to a liquid crystal alignment treatment by rubbing with a roll wound with a cloth comprising a synthetic fiber such as nylon to obtain a liquid crystal alignment layer.

Examples of the substrate which can be used include a transparent substrate made by a glass such as a float glass and soda glass, and plastic films such as polyethylene terephthalate, polybutylene terephthalate, polyethersulfone and polycarbonate. The two substrates, on which the alignment layers have been formed, face each other in such a manner that the rubbing direction of the alignment layers are at cross or antiparallel to each other, and the substrates are sealed with a sealing agent with an inlet for the liquid crystal. Liquid crystal is then filled in the space between the substrates, and the inlet is closed to obtain a liquid crystal cell. Polarizing plates are attached to both surfaces of the liquid crystal cell in such a manner that the polarization direction is antiparallel or at cross to the rubbing direction of the alignment layer of the substrate to obtain a liquid crystal display device.

EXAMPLES

The present invention is further illustrated in greater detail with reference to the following examples and comparative examples, but these examples are not construed to limit the present invention.

Synthesis Example 1

α,ω-Bis(3-aminopropyl)polydimethylsiloxane (a product of Shinetsu Chemical Co., Ltd., Mn=1652, hereinafter referred to PDMS-diamine 1) was used as a polysiloxane compound. First, PDMS-diamine 1 was reacted with chlorotrimethylsilane while heating under refluxing in toluene in the presence of triethylamine to effect trimethylsilylation at the terminal of the diamine (hereinafter referred to as silylated PDMS-1). In the same manner as above, an amino group of 4,4'-diaminophenyl ether was silylated. 1.80 g of silylated PDMS-1 and 10.32 g of silylated 4,4'-diaminophenyl ether were dissolved in 150 ml of diethylene glycol dimethyl ether in a flask while stirring in a nitrogen atmosphere. Then, 6.76 g of pyromellitic anhydride was added thereto, and the mixture was polymerized at 30° C. for 3.5 hours. The reaction solution was poured into an excess amount of methanol to precipitate the reaction product which was then washed with methanol and dried under reduced pressure at 40° C. for 20 hours to obtain a polysiloxane-polyamide acid trimethylsilyl ester type block copolymer (hereinafter referred to Polymer 1).

Synthesis Example 2

α,ω-Bis(3-aminopropyl)polydimethylsiloxane (a product of Shinetsu Chemical Co., Ltd., Mn=824, hereinafter referred to PDMS-diamine 2) was used as a polysiloxane compound. 4,4'-Diaminodiphenylmethane and 3,3',4,4'-biphenyltetracarboxylic acid anhydride were used as polyimide components. In the same manner as described in Synthesis Example 1, 4.92 g of silylated PDMS-diamine 2, 13.68 g of silylated 4,4'-diaminophenylmethane and 13.23 g of 3,3',4,4'-biphenyltetracarboxylic anhydride were reacted to obtain a polysiloxane-polyamide acid trimethylsilyl ester type block copolymer (hereinafter referred to Polymer 2).

Example 1

Polymer 1 obtained in Synthesis Example 1 and hydroxypropyl cellulose were mixed at a ratio of 1 to 3, and the resulting mixture was dissolved in N-methylpyrrolidone in an amount of 2 wt % to obtain a solution. The resulting solution had a viscosity of 8 cp (at 25° C.). This solution was coated on a glass substrate having a transparent electrode by using a spinner and then heated at 300° C. for 1 hour to obtain a coated film of the mixture. The thickness of the resulting coated film was about 50 nm. The adhesion of the resulting coated film to the glass substrate was tested by the cross-cut method, i.e., by measuring a number of peeled coated films of 100 cross-cut coated films, and, as a result, no peeling-off was observed. Further, the coated films were rubbed in one direction with a nylon cloth, and then a pair of the coated substrates was sealed with a spacer of 20 μm thickness being inserted between the substrates In such a manner that the rubbing direction was opposite to each other. The nematic liquid crystal (ZLI 4792, produced by Merck Co.) was filled into the space between the substrates to prepare a liquid crystal cell. The pretilt angle of the resulting liquid crystal cell was measured and found to be 3.2°. Also, in the twisted nematic cell, the direction of the long axis of the liquid crystal molecule projected on the surface to the substrate was found to correspond to the direction in which the rubbing direction was rotated by 4° to the direction of the liquid crystal in micro domains. Further, TN display characteristics at 45° and 90° in terms of the contrast were compared, in which the angle parallel to the surface of the cell was referred to as 0° and the angle vertical to the front surface of the cell was referred to as 90°. As a result, no difference in the contrast at the both angles were observed, showing that the viewing angle was apparently widened.

Example 2

Polymer 2, obtained in Synthesis Example 2, and polystyrene were dissolved in an amount of 2 wt % to obtain a solution. A liquid crystal cell was prepared using the resulting solution and evaluated in the same manner as described in Example 1. The pretilt angle was 3.2°, and the direction of the long axis of the liquid crystal molecule projected on the surface of the substrate was found to correspond to the direction in which the rubbing direction was rotated by 90° to the direction of the liquid crystal in micro domains. Further, as a result of comparison of display characteristics at 45° and 90° in the same manner as described in Example 1, no difference in the contrast at the both angles was observed, showing that the viewing angle was apparently widened.

Comparative Example 1

A liquid crystal cell was prepared using Polymer 1 obtained in Synthesis Example 1 and evaluated in the same manner as described in Example 1. The pretilt angle was found to be 3.5°. Further, as a result of comparison of display characteristics at 45° and 90° in the same manner as described in Example 1, a display device portion was black-to-white reversed.

We claim:

1. A liquid crystal display device having a liquid crystal layer comprising liquid crystal molecules between a pair of substrates each comprising a transparent electrode having provided thereon an alignment layer wherein the alignment layers are arranged so as to face each other and wherein at least one of said alignment layers has been subjected to a rubbing treatment, which comprises rubbing the alignment layer in one direction, and said alignment layer comprises a mixture of a polymer (A), which is a polyamide comprising a siloxane component, and a polymer (B), which has the property of aligning the liquid crystal in such a manner that the direction of a long axis of the liquid crystal molecules projected on the surface of the substrate is different from the rubbing direction.

2. A liquid crystal display device as claimed in claim 1, wherein said polymer (B) has a helical structure.

3. A liquid crystal display device as claimed in claim 2, wherein said polyamide (A) is a block copolymer.

4. A liquid crystal display device as claimed in claim 2, wherein said polymer (A) is a polyamide comprising from 0.1 to 50% by weight siloxane.

5. A liquid crystal display device as claimed in claim 2, wherein said mixture comprises a ratio of polymer (A) to polymer (B) from 1:10 to 5:1.

6. A liquid crystal display device as claimed in claim 1 wherein said polymer (B) is cellulose or a derivative thereof.

7. A liquid crystal display device as claimed in claim 6, wherein said polymer (A) is a polyamide comprising from 0.1 to 50% by weight siloxane.

8. A liquid crystal display device as claimed in claim 6, wherein said mixture comprises a ratio of polymer (A) to polymer (B) from 1:10 to 5:1.

9. A liquid crystal display device as claimed in claim 1, wherein said polymer (B) is polystyrene or a derivative thereof.

10. A liquid crystal display device as claimed in claim 9, wherein said polymer (A) is a polyamide comprising from 0.1 to 50% by weight siloxane.

11. A liquid crystal display device as claimed in claim 9, wherein said mixture comprises a ratio of polymer (A) to polymer (B) from 1:10 to 5:1.

12. A liquid crystal display device as claimed in claim 1 wherein said polymer (A) is a block copolymer.

13. A liquid crystal display device as claimed in claim 12, wherein said polymer (A) is a polyamide comprising from 0.1 to 50% by weight siloxane.

14. A liquid crystal device as claimed in claim 1, wherein said siloxane includes a modified siloxane compound represented by the following general formula (I):

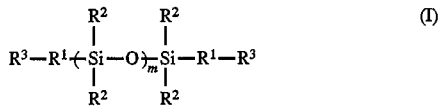

wherein:

m is an integer of 1 or more, $R^1$ is a divalent hydrocarbon group, $R^2$ is a monovalent straight chain or branched chain aliphatic hydrocarbon group having from 1 to 5 carbon atoms, an alicyclic hydrocarbon group or an aromatic hydrocarbon group, and $R^3$ is —$NH_2$, —OH, —COOH or —$NHSi(CH_3)_3$.

15. A liquid crystal display device as claimed in claim 14, wherein m is between 5 and 100.

16. A liquid crystal display device as claimed in claim 1, wherein said polymer (A) is a polyamide comprising from 0.1 to 80% by weight siloxane.

17. A liquid crystal display device as claimed in claim 1, wherein said polymer (A) is a polyamide comprising from 0.1 to 50% by weight siloxane.

18. A liquid crystal display device as claimed claim 1, wherein said mixture comprises a ratio of polymer (A) to polymer (B) from 1:20 to 20:1.

19. A liquid crystal display device as claimed in claim 1, wherein said mixture comprises a ratio of polymer (A) to polymer (B) from 1:10 to 5:1.

* * * * *